United States Patent
Schmitt et al.

(10) Patent No.: US 12,359,747 B2
(45) Date of Patent: Jul. 15, 2025

(54) VALVE PACKING APPARATUS AND RELATED METHODS

(71) Applicant: Fisher Controls International LLC, Marshalltown, IA (US)

(72) Inventors: Lucas Schmitt, Conrad, IA (US); Steven Hostetter, Colfax, IA (US); Aaron Anderson, Marshalltown, IA (US); Lisa Miller, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 17/896,768

(22) Filed: Aug. 26, 2022

(65) Prior Publication Data

US 2024/0068595 A1 Feb. 29, 2024

(51) Int. Cl.
*F16K 41/02* (2006.01)
*F16J 15/18* (2006.01)
*F16K 41/16* (2006.01)

(52) U.S. Cl.
CPC ............. *F16K 41/02* (2013.01); *F16J 15/186* (2013.01); *F16K 41/16* (2013.01)

(58) Field of Classification Search
CPC .......... F16K 41/02; F16K 41/16; F16K 41/04; F16K 3/0227; F16K 1/2078; F16K 1/2268; F16K 5/0485; F16K 5/0694; F16K 41/023; F16K 41/026; F16K 41/043; F16K 41/046; F16K 41/06; F16K 41/063; F16K 41/066; F16J 15/186; F16J 15/184; F16J 15/189; F16J 15/18
See application file for complete search history.

(56) References Cited

U.S. PATENT DOCUMENTS

| | | | |
|---|---|---|---|
| 4,186,761 A | | 2/1980 | Guarnieri |
| 4,289,317 A | * | 9/1981 | Kuc ...................... F04D 29/106 |
| | | | 251/340 |
| 5,078,175 A | * | 1/1992 | Martin ................... F16J 15/441 |
| | | | 277/530 |
| 5,230,498 A | * | 7/1993 | Wood ..................... F16J 15/186 |
| | | | 137/553 |
| 5,238,252 A | | 8/1993 | Stewen et al. |
| 5,263,682 A | * | 11/1993 | Covert .................. F16K 41/046 |
| | | | 277/517 |

(Continued)

OTHER PUBLICATIONS

United States Patent and Trademark Office, "Non-Final Office Action," issued Oct. 5, 2023 in connection with U.S. Appl. No. 17/896,872, 19 pages.

(Continued)

*Primary Examiner* — Craig M Schneider
*Assistant Examiner* — Andrew J Rost
(74) *Attorney, Agent, or Firm* — Hanley, Flight & Zimmerman, LLC

(57) ABSTRACT

Methods, apparatus, systems, and articles of manufacture of valve packing apparatus and related methods are described. An apparatus includes a cartridge including packing components and a spring. The cartridge is dimensioned to fit in a bore of a bonnet of a valve. A cap is coupled to the cartridge to retain the packing components and the spring. The cap is to compress the packing components and the spring to a predetermined load in response to the cartridge being fastened to the bonnet of a valve.

20 Claims, 6 Drawing Sheets

(56) References Cited

U.S. PATENT DOCUMENTS

| | | | |
|---|---|---|---|
| 5,584,219 A | 12/1996 | Dunn et al. | |
| 5,743,288 A * | 4/1998 | Mosman | F16K 43/008 |
| | | | 251/327 |
| 6,167,959 B1 * | 1/2001 | Bassinger | E21B 33/08 |
| | | | 166/84.2 |
| 6,673,201 B2 * | 1/2004 | Vogel | D21C 7/00 |
| | | | 162/57 |
| 8,100,407 B2 * | 1/2012 | Stanton | F16J 15/183 |
| | | | 277/522 |
| 8,281,797 B2 * | 10/2012 | Brestel | F16K 41/026 |
| | | | 137/15.18 |
| 8,469,057 B2 | 6/2013 | Gamache et al. | |
| 8,622,367 B2 * | 1/2014 | Lovell | F16K 41/02 |
| | | | 277/510 |
| 8,863,768 B2 * | 10/2014 | Kang | F16K 43/00 |
| | | | 137/315.28 |
| 9,863,552 B2 * | 1/2018 | Fan | F16K 1/2268 |
| 2007/0273105 A1 * | 11/2007 | Stanton | F04B 53/164 |
| | | | 277/500 |
| 2012/0153202 A1 | 6/2012 | Lin et al. | |
| 2017/0097107 A1 | 4/2017 | Hotz et al. | |

OTHER PUBLICATIONS

United States Patent and Trademark Office, "Final Office Action," issued in connection with U.S. Appl. No. 17/896,872, dated Apr. 25, 2024, 21 pages.

United States Patent and Trademark Office, "Advisory Action," issued in connection with U.S. Appl. No. 17/896,872, dated Jul. 30, 2024, 4 pages.

United States Patent and Trademark Office, "Notice of Allowance," issued in connection with U.S. Appl. No. 17/896,872, dated Sep. 28, 2024, 17 pages.

* cited by examiner

VALVE PACKING APPARATUS AND RELATED METHODS

FIELD OF THE DISCLOSURE

This disclosure relates generally to fluid valves and, more particularly, to valve packing apparatus and related methods.

BACKGROUND

Process control systems often employ fluid valves to regulate process fluids. A typical fluid valve controls fluid flow by moving a plug, ball, or other fluid flow control member within the fluid flow path of the valve. To manipulate the fluid flow control member, a sliding stem or rotating shaft may be coupled to an actuator (e.g., a pneumatic actuator, a hydraulic actuator, a manual actuator, etc.). To prevent unintended leakage of process fluid from the valve along the valve stem or shaft, fluid valves commonly utilize a packing assembly that seals the valve stem or shaft to a body (e.g., bonnet portion) of the valve.

A valve packing typically includes an assembly of components such as springs, spacers (e.g., lantern rings), wipers, and seals, all of which are arranged in a particular order (e.g., or stack) along the valve stem or shaft, and which are properly loaded to prevent leakage. The components of a valve packing may deteriorate over time and, thus, the valve packing may be serviced (e.g., replaced) during the service life of the valve to restore the leakage prevention characteristics of the packing. Installation of a valve packing during manufacture of a valve or during field service of a valve is often a complex, difficult and error-prone process. For example, the components of a valve packing assembly must typically be installed in a particular order and orientation for the packing to function properly. Installation of the components in the wrong order or orientation and/or damaging one or more of the components during installation can lead to undesired leakage past the packing and to the environment via a bonnet. Further, a precise load (e.g., a compressive load) is typically applied to the installed packing components to establish a proper seal to achieve the desired leakage characteristics. More specifically, if the applied packing load or stress is too low, unacceptable leakage of process fluid into the surrounding environment may result. On the other hand, if the applied packing load or stress is too high, an unacceptable amount of friction between the packing components and the valve stem or shaft may result in excessive, premature wear of the packing and, thus, a reduced service life of the packing and/or the valve or, more generally, decreased performance of the valve.

Figure 1:
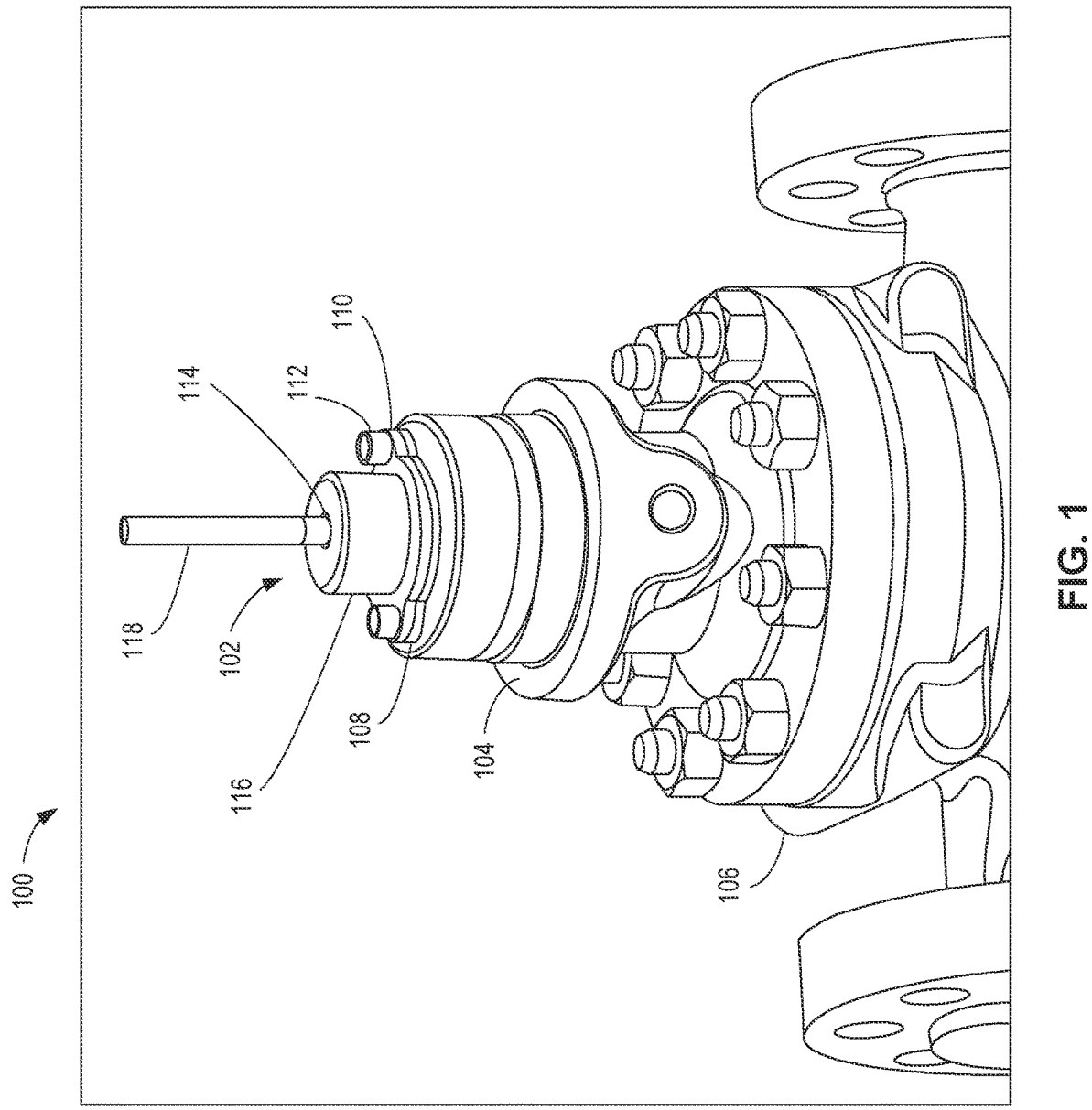
FIG. 1 illustrates an example fluid control valve having an example valve packing cartridge assembly constructed in accordance with the teachings of this disclosure.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

SUMMARY

In one example, an apparatus to install a valve packing comprises a cartridge including packing components and a spring, the cartridge is dimensioned to fit in a bore of a bonnet of a valve. A cap is coupled to the cartridge to retain the packing components and the spring, the cap is to compress the packing components and the spring to a predetermined compressive load in response to the cartridge being fastened to the bonnet of a valve.

In another example, an apparatus to install a valve packing comprises a cylindrical tube having a first end and a second end, the tube having an outer surface dimensioned to fit within a bore of a valve. A biasing member is disposed proximate the first end of the cylindrical tube. Packing components are disposed within the tube adjacent the biasing member and a cap retains the packing components and the biasing member within the cylindrical tube where the cap is to compress the packing components and the biasing member to a predetermined load after the cylindrical tube has been inserted into the bore of a valve.

In another example, an apparatus to install a valve packing includes means for applying a predetermined compressive load to packing components and means for compressing the means for applying the predetermined compressive load.

DETAILED DESCRIPTION

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified in the below description.

In general, fluid control valves are implemented with valve packing components (e.g., seals) that are loaded (e.g., under a compressive load) to achieve a desired leakage characteristic (e.g., fluid tight or approximately zero leakage). For example, a sliding stem fluid valve has valve packing components (e.g., lantern rings, seals, springs, v-rings) surrounding a valve stem within a bore of a bonnet. Valve packing components are inserted into the bonnet of a valve during the initial manufacturing process or while the valve packing is being serviced in the field. Traditionally, to adjust the compressive load imparted to the valve packing assembly, fasteners (e.g., nuts, bolts, etc.) are manipulated to increase or decrease the compressive force applied to the packing components. As the compressive force increases to provide a load on the packing, sealing components of the packing assembly compress to cause the seals to expand radially toward a stem or a shaft and/or outer surfaces of the seals to expand radially toward an inner surface of a packing bore of a bonnet to provide a seal. Thus, during initial manufacture or service of the valve, the packing components must be inserted into the bonnet in the correct order and orientation and without damaging the components. Further, the fasteners that load the packing components must be tightened precisely to ensure the packing has sufficient loading to function properly and have a long service life. However, the above-mentioned known packing installation process is difficult and error-prone, particularly in a field service situation.

The example methods and apparatus described herein ensure the installation of valve packing components in the correct order and orientation and, additionally, ensure application of a precise predetermined compressive load on the packing components while eliminating the need for a person to manually adjust the load following installation of the valve packing components.

FIG. 1 is an example fluid valve 100 having an example valve packing cartridge assembly 102 installed within the fluid valve 100. In the example of FIG. 1, the fluid valve 100 is a sliding stem fluid valve. However, in other examples, the valve packing cartridge assembly 102 may be implemented in any other type of valve (e.g., a rotary valve). In the illustrated example, the valve packing cartridge assembly 102 is coupled to (e.g., disposed within) a bonnet 104 of the fluid valve 100 that is coupled to a valve body 106 of the fluid valve 100. The valve packing cartridge assembly 102 is coupled to the bonnet 104 via a cartridge flange 108, a cap flange 110, and bolts 112. In other examples, the valve packing cartridge assembly 102 is coupled to the bonnet 104 of the fluid valve 100 via other means (e.g., a flange separate from the valve packing cartridge assembly 102). Disposed through a cap aperture 114 of a cap 116 is a valve stem 118. As described in greater detail below, the cap 116 retains a biasing element and packing components within the valve packing cartridge assembly 102. Before the valve packing cartridge assembly 102 is coupled to the bonnet 104, the internal biasing element and packing components are in an uncompressed state. During the coupling of the valve packing cartridge assembly 102 to the bonnet 104, the cap 116 compresses the biasing element to apply a predetermined compressive load to the packing components to create a desired seal with the valve stem 118.

Figure 2:
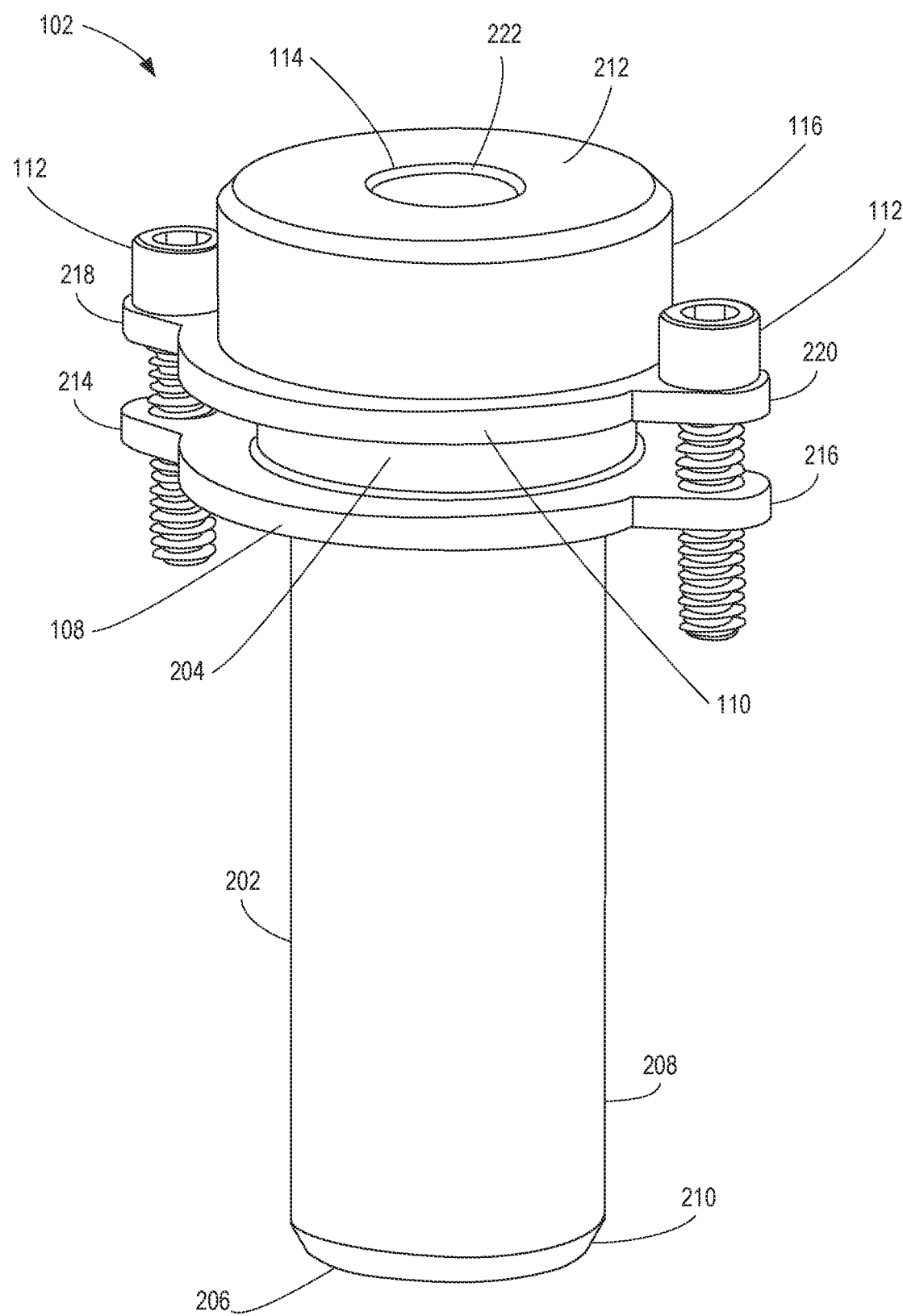
FIG. 2 is an enlarged view of the example valve packing cartridge assembly of FIG. 1.

FIG. 2 is an enlarged view of the example valve packing cartridge assembly 102 of FIG. 1. As shown in FIG. 2, the valve packing cartridge assembly 102 includes a cartridge 202 having a first end 204 and a second end 206 opposite the first end 204. The valve packing cartridge assembly 102 additionally includes the cap 116 and the bolts 112. The cartridge 202 in this example is a generally cylindrical tube having an outer surface 208 that is dimensioned (e.g., has a diameter) to fit within a valve (e.g., a bore of the bonnet 104 of FIG. 1, a valve body, etc.). The second end 206 of the cartridge 202 has a chamfered portion 210 to guide and facilitate insertion of the cartridge 202 into a valve. Additionally, the cartridge 202 may be lubricated (e.g., using grease) to enable a low-friction installation of the valve packing cartridge assembly 102. The cap 116 is dimensioned to receive the first end 204 of the cartridge 202 and includes a wall portion 212 that functions as a seat for a biasing element. The wall portion 212 of the cap 116 includes the cap aperture 114 that is sized to receive a stem or shaft of a valve into which the valve packing cartridge assembly 102 is to be installed (e.g., the valve stem 118).

The cartridge 202 also includes the cartridge flange 108 that receives the bolts 112 to couple (e.g., fasten) the valve packing cartridge assembly 102 to a valve body (e.g., a bonnet portion of a valve body). In the illustrated example, the cartridge flange 108 has two ears 214, 216 through which the bolts 112 pass, but additional ears or other features to receive fasteners may be added or used instead of the ears 214, 216. Like the cartridge flange 108, the cap flange 110 has two ears 218, 220 through which the bolts 112 pass. Additional ears or other features to receive fasteners may be added or used instead of the ears 214, 216 and the ears 218, 220. In other examples, the cartridge flange 108 and the cap flange 110 may not be integrated with the cartridge 202 and/or the cap 116 respectively. For example, the valve packing cartridge assembly 102 may be coupled to a valve using additional means (e.g., a separate flange).

The cartridge 202, the cap 116, the cartridge flange 108, and the cap flange 110 may be made of a metallic material. For example, the cartridge 202, the cap 116, the cartridge flange 108 and the cap flange 110 may be made of a metallic material more corrosion resistant than the material of the bonnet 104. In some examples, the cartridge flange 108 and/or the cap flange 110 are made of a metallic material different than the cartridge 202 and/or the cap 116. The bolts 112 provide a means for coupling the valve packing cartridge assembly 102 to a valve (e.g., the bonnet 104 of FIG.

1). However, in other examples, alternate means for coupling are used (e.g., screws, nuts and bolts, clamps, etc.)

The cap 116 retains an internal biasing element (e.g., one or more springs) and packing components in an uncompressed state within the cartridge 202 of the valve packing cartridge assembly 102 before the valve packing cartridge assembly 102 is coupled to a valve (e.g., during the initial installation of the valve packing cartridge assembly 102 into a valve, during shipment of the cartridge 202 from the factory, etc.). At the completion of the installation of the valve packing cartridge assembly 102 into a valve, the cap 116 is coupled to the cartridge 202 to compress the biasing element to apply a predetermined compressive load to the packing components.

In some examples, once the valve packing cartridge assembly 102 is installed in a valve, a valve stem articulates within the valve packing cartridge assembly 102. The cap aperture 114 includes a cap aperture chamfer 222 to guide the movement of the valve stem (e.g., the valve stem 118 of FIG. 1).

Figure 3:
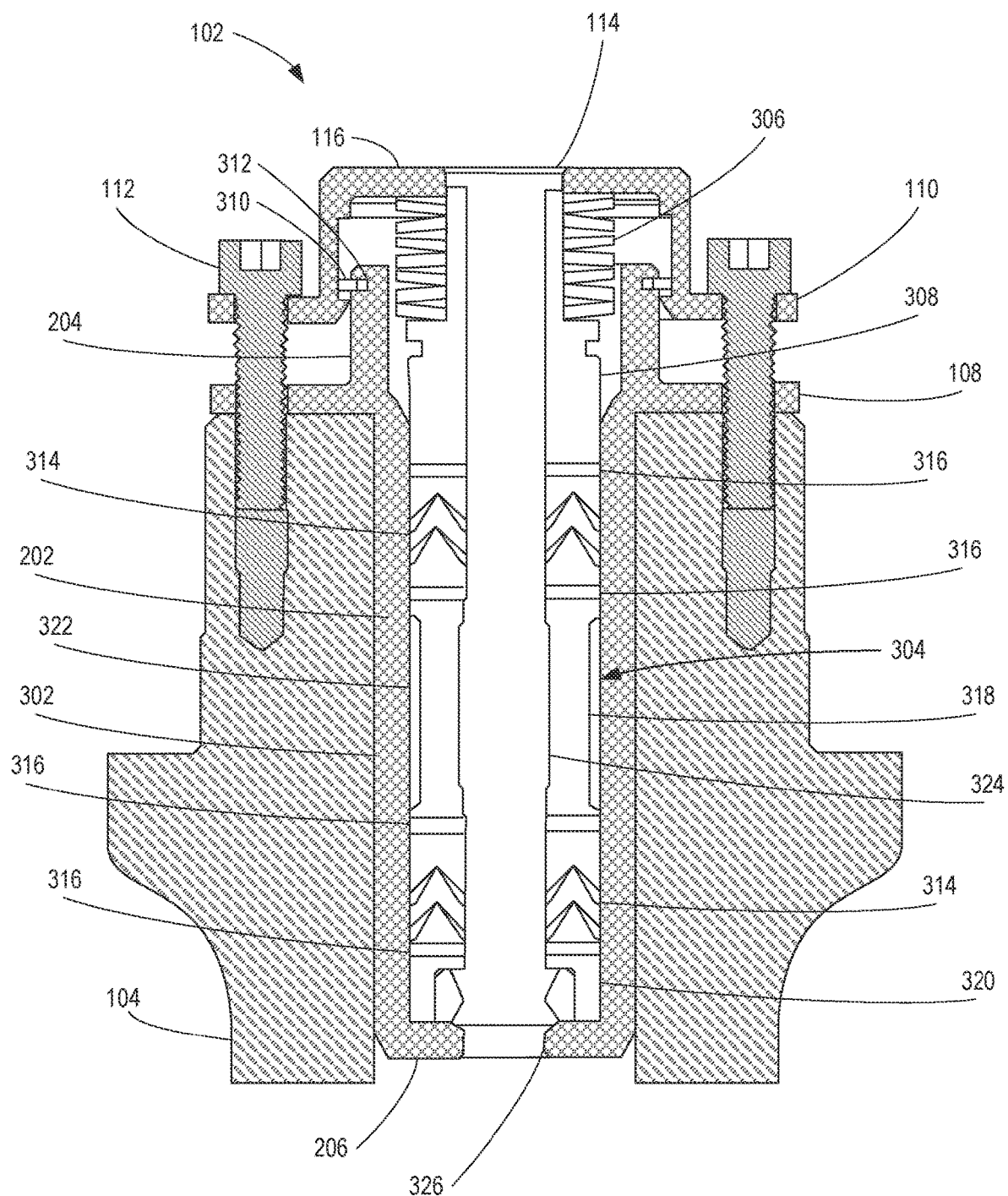
FIG. 3 is an enlarged cross-sectional view of the example valve packing cartridge assembly of FIGS. 1-2 disposed within an example bore of a bonnet with the packing components not loaded.

FIG. 3 is an enlarged cross-sectional view of the example valve packing cartridge assembly of FIGS. 1-2 disposed within a bore 302 of the bonnet 104 with the cap 116 and the cartridge 202 not fully coupled and an example stack of packing components 304 not loaded. Fully inserted and partially fastened with the bonnet 104 is the valve packing cartridge assembly 102. Retained within the valve packing cartridge assembly 102 by the cap 116 is a biasing element 306, the stack of packing components 304, and a spring pack follower 308. In other examples, other materials and/or parts in addition to the cap 116 may retain and/or contribute to the retention of the stack of packing components 304 or any other components internal to the valve packing cartridge assembly 102. In some examples, the stack of packing components 304, the spring pack follower 308, and the biasing element 306 are installed into the valve packing cartridge assembly 102 via the first end 204 of the cartridge 202. Following the insertion of the above-mentioned elements into the valve packing cartridge assembly 102, the cap 116 is installed over the first end 204 and retained to the cartridge 202 by a retaining ring 310. The retaining ring 310 is disposed within an annular groove 312 at the first end 204 of the cartridge 202. The bolts 112 are disposed through the cap flange 110 and the cartridge flange 108 and partially within the bonnet 104. To complete the installation of the valve packing cartridge assembly 102 into a valve, the bolts 112 are tightened to fully couple or fasten the cap 116 to the cartridge 202 and to additionally couple the valve packing cartridge assembly 102 to the bonnet 104 after the valve packing cartridge assembly 102 is installed with a stem of a valve.

The spring pack follower 308 maintains alignment of the biasing element 306 prior to the installation of the valve packing cartridge assembly 102 over a valve stem and into a valve. The biasing element 306 is a spring (e.g., a Belleville spring). Alternatively, the biasing element 306 can be one or more springs or can be any element capable of applying a compressive load to the stack of packing components 304. In the example of FIG. 3, the stack of packing components 304 includes packing seals 314, anti-extrusion washers 316, a spacer 318, and a packing box ring 320. In addition to the example elements shown in FIG. 3, in other examples, the elements that compose the stack of packing components 304 may include any number of packing wipers, spacers (e.g., lantern rings), packing set rings, packing followers, and/or any other suitable valve packing element(s). The stack of packing components 304 may be configured in a predetermined arrangement (e.g., the arrangement in FIG. 3) and/or in any other arrangement appropriate for the application. When the stack of packing components 304 is positioned and aligned with a bore 322 of the cartridge 202, a packing stem aperture 324 is defined by the remaining cylindrical space central to the stack of packing components 304 and the bore 322 of the cartridge 202. In other examples, the packing stem aperture 324 could be an alternative shape (e.g., having a rectangular cross-section). The second end 206 of the cartridge 202 includes an aperture 326 to receive a valve stem (e.g., the valve stem 118 of FIG. 1).

In the example of FIG. 3, the biasing element 306 and the stack of packing components 304 are uncompressed. In some examples, the packing seals 314 (e.g., and other ones of the stack of packing components 304) are in an uncompressed or non-deflected condition while the cap 116 is retained to the cartridge 202 by the retaining ring 310 and before the cap 116 has been fully coupled to the cartridge 202. Additionally, in the illustrated example, the stack of packing components 304 is separated or spaced from the biasing element 306 by the spring pack follower 308. An example method to install the valve packing cartridge assembly 102 into the bore 302 of the bonnet 104 is described below in connection with FIG. 6.

In some examples, the valve packing cartridge assembly 102 is sealed against undesired leakage between the bore 302 of the bonnet 104 and the outer surface 208 (FIG. 2) of the cartridge 202 with a means for sealing (e.g., a gasket, O-rings, sealing compounds, etc.) For example, a gasket can be provided at an interface of the bonnet 104 and the cartridge flange 108 of the cartridge 202. In some examples, a seal (e.g., an O-ring) can be provided on the outer surface 208 (FIG. 2) of the cartridge 202. In additional examples, (e.g., the example detailed in FIG. 4), following the installation of the valve packing cartridge assembly 102 into the bore 302 of the bonnet 104, the valve stem 118 (FIG. 1) is installed through the cap aperture 114, through the packing stem aperture 324 of the stack of packing components 304, through the aperture 326, and coupled to a plug or other flow control member of a valve.

Figure 4:
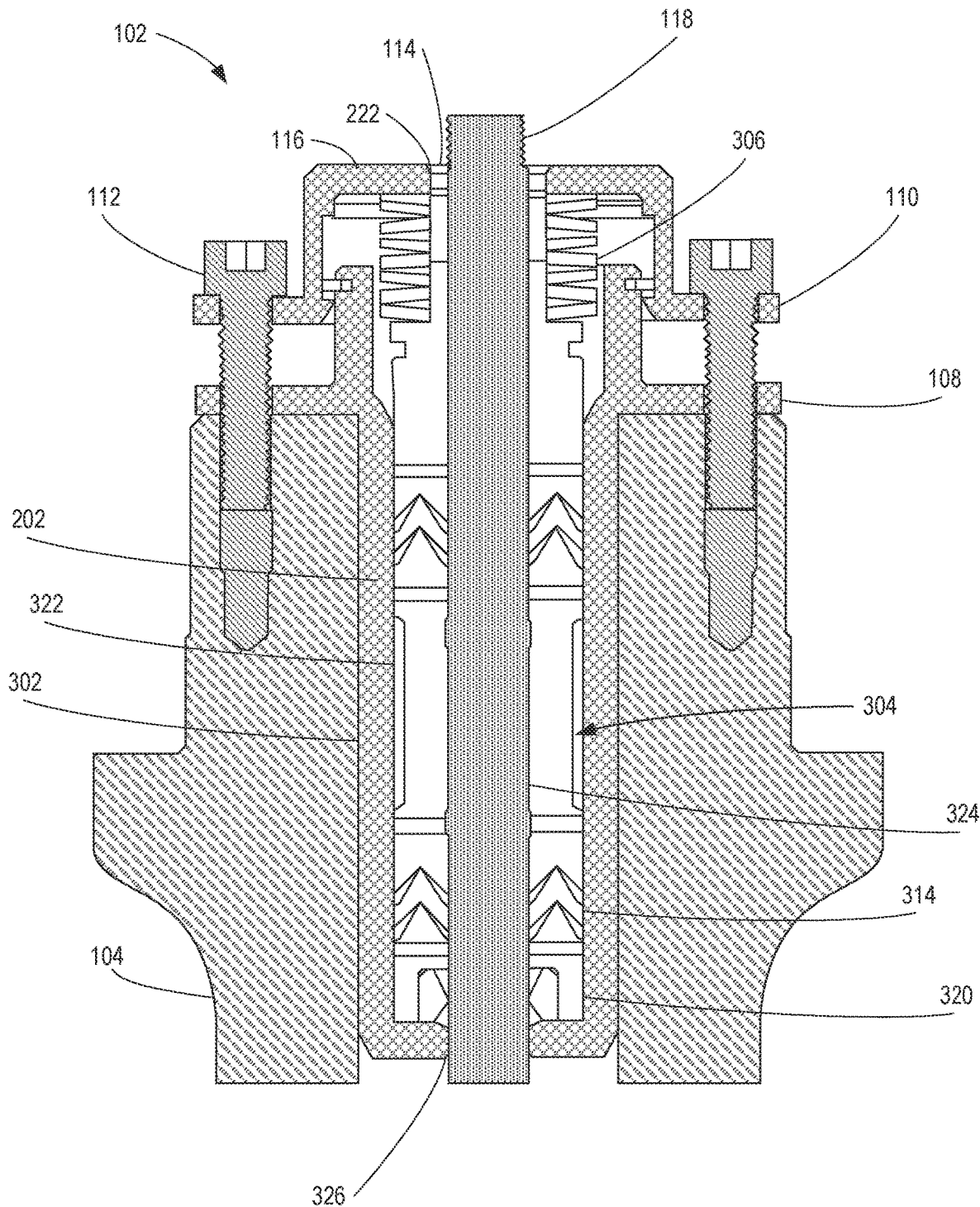
FIG. 4 depicts the assembly of FIG. 3 with a valve stem installed.

FIG. 4 depicts the assembly of FIG. 3 with the valve stem 118 installed. The valve stem 118 is dimensioned to fit within the cap aperture 114. The cap aperture 114 has the cap aperture chamfer 222 to guide the valve stem 118 during insertion. In this example, following the installation of the valve packing cartridge assembly 102 into the bore 302 of the bonnet 104, the valve stem 118 is inserted through the cap aperture 114, through the packing stem aperture 324 of the stack of packing components 304, and coupled to a plug of a valve. In other examples, before the valve packing cartridge assembly 102 is inserted into the bore 302 and coupled to the bonnet 104 via the cap flange 110, the cartridge flange 108 and the bolts 112, the valve stem 118 is inserted into the bore 302 of the bonnet 104 and coupled to a plug of a valve.

In this example, following the installation of the valve stem 118 into the bonnet 104, the valve packing cartridge assembly 102 is installed over the valve stem 118 and into the bore 302 of the bonnet 104. In the example of FIG. 4, the valve stem 118 is a sliding stem. Alternatively, the valve stem 118 can be a rotary shaft or any other stem or shaft suitable for use with a valve. The valve stem 118 may be lubricated (e.g., using grease) to enable a low-friction installation of the valve stem 118 through the valve packing cartridge assembly 102. In some examples, the packing box ring 320 includes a wiper to remove particulate and debris from the valve stem 118 during its insertion through the cap aperture 114 and through the packing stem aperture 324.

In the example of FIG. 4, the cap 116 has not been fully coupled to the cartridge 202 and the biasing element 306 and the stack of packing components 304 are uncompressed. During the insertion of the valve stem 118 through the cap aperture 114 and through the packing stem aperture 324, the stack of packing components 304 may remain uncompressed to allow for a low resistance (e.g., low friction) insertion of the valve stem 118 though the cap aperture 114, through the stack of packing components 304, and through the aperture 326. In some examples, once the valve packing cartridge assembly 102 is coupled to the bonnet 104 and the cap 116 is fully coupled to the cartridge 202 to apply a compressive load to the stack of packing components 304, the stack of packing components 304 expand radially to create a desired seal against the valve stem 118 and the bore 322 of the cartridge 202.

Figure 5:
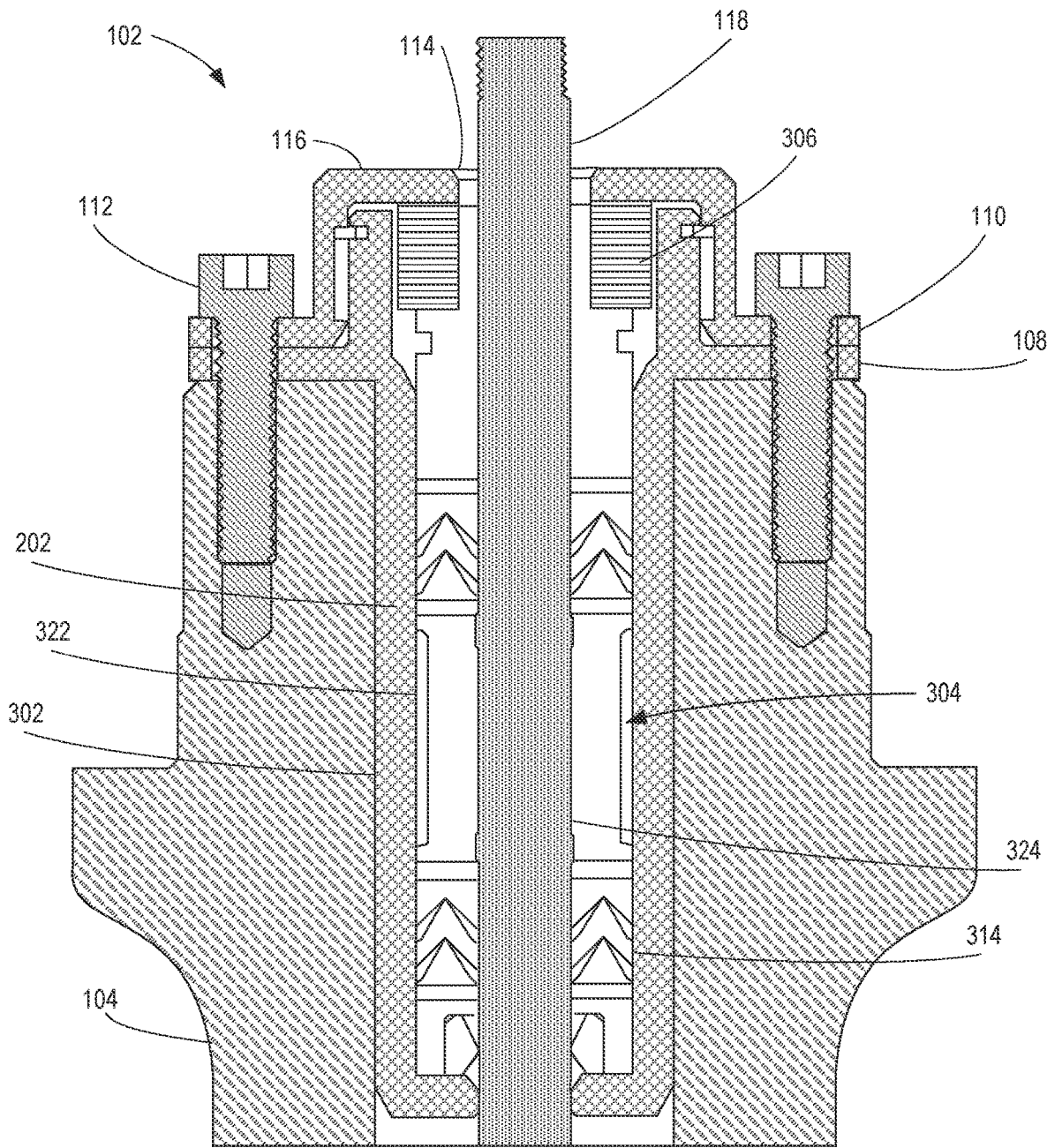
FIG. 5 depicts the example valve packing cartridge assembly of FIGS. 1-4 with the cap fully coupled to the cartridge and the packing components loaded.

FIG. 5 depicts the example valve packing cartridge assembly 102 of FIGS. 1-4 with the cap 116 fully coupled to the cartridge 202 and the biasing element 306 and the stack of packing components 304 compressed. The valve packing cartridge assembly 102 is installed in the bore 302 and coupled to the bonnet 104 via the cap flange 110, the cartridge flange 108 and the bolts 112. Additionally, the valve stem 118 is disposed through the cap aperture 114 and the packing stem aperture 324 and is installed in a valve.

In the example of FIG. 5, the bolts 112 have been tightened to fully couple the cap 116 and the cartridge 202 to compress the biasing element 306 to apply a predetermined compressive load to the stack of packing components 304. As a result, the stack of packing components 304 (e.g., the packing seals 314) radially expand under the load of the biasing element 306 to provide a seal around the valve stem 118 and an inner surface of the cartridge to prevent process fluid flowing through a valve body from leaking past the valve stem 118 and the inner surface of the cartridge 202 to the surrounding environment.

In some examples, the seal created by the stack of packing components 304 under a compressive load from the biasing element 306 allows for the movement of the valve stem 118. For example, when the example valve stem 118 is a sliding stem, the valve stem 118 can slide within the packing stem aperture 324 and pass through the cap aperture 114. Alternatively, if the valve stem 118 is instead a rotary shaft, the shaft can rotate within the packing stem aperture 324 and the cap aperture 114. In these examples, the movement of the valve stem 118 can occur without compromising the desired integrity of the seal between the stack of packing components 304 (e.g., the packing seals 314), the valve stem 118, and the bore 322 of the cartridge 202.

Figure 6:
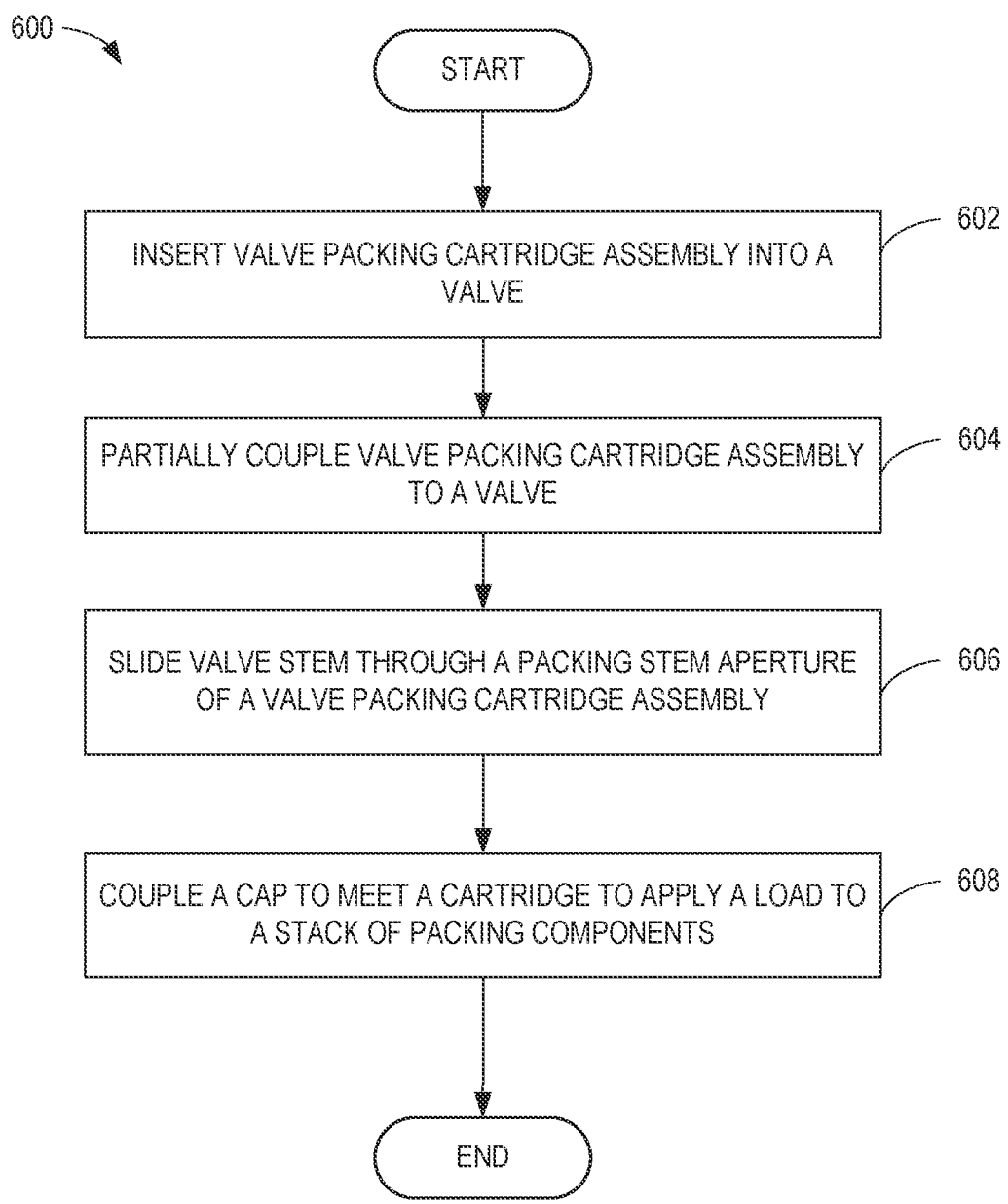
FIG. 6 is a flow diagram of an example method that can be used to implement the example valve packing cartridge assembly described herein.

FIG. 6 is a flow diagram of an example method that can be used to implement the example valve packing cartridge assembly 102 described herein. The example method 600 may be implemented to install the example valve packing cartridge assembly 102 into the example valve 100 without damaging the valve packing cartridge assembly 102 or the example valve 100. The example method 600 may prevent undesired fluid leaks in the valve 100 and facilitate the installation of a valve packing (e.g., the valve packing cartridge assembly 102) while eliminating the possibility of installing components in the wrong order or orientation, damaging components, and/or improperly loading the components. Additionally, the example method 600 may be performed by hand. However, in other examples this method may be completed with the assistance of additional equipment, materials, and/or tools.

The example method 600 begins with first inserting a valve packing cartridge assembly into a valve (block 602). In some examples, the insertion of the valve packing cartridge assembly 102 into a valve (e.g., the valve 100) first includes aligning the second end 206 with the bore 302 of the bonnet 104 facilitated by the chamfered portion 210. The second end 206 extends to a desired depth within the bore 302 of the bonnet 104 determined by the distance the second end 206 travels during the insertion of the valve packing cartridge assembly 102 until the cartridge flange 108 meets the surface of the bonnet 104. In some examples, the valve packing cartridge assembly 102 is sealed against undesired leakage between the bore 302 of the bonnet 104 and the outer surface 208 of the cartridge 202 and/or between the bonnet 104 and the cartridge flange 108. For example, a radial seal can be provided between the bore 302 of the bonnet 104 and the outer surface 208 of the cartridge 202 and/or a gasket can be provided between the bonnet 104 and the cartridge flange 108. Additionally, the cartridge 202 may be lubricated (e.g., using grease) to enable a low-friction installation of the valve packing cartridge assembly 102 into the bore 302. In some examples, the insertion of the valve packing cartridge assembly 102 into the bore 302 of the bonnet 104 is achieved by hand and/or via a tool. In some examples, the valve packing cartridge assembly 102 is installed into the bore 302 after the valve stem 118 is installed. During the insertion of the valve packing cartridge assembly 102 into the bore 302 the biasing element 306 and the stack of packing components 304 remain uncompressed and are retained within the cartridge 202 by the cap 116.

The example method 600 includes partially coupling a valve packing cartridge assembly to a valve (block 604). In some examples, following the insertion of the valve packing cartridge assembly 102 into the bore 302 of the bonnet 104, the valve packing cartridge assembly 102 is partially coupled with the bonnet 104 via the cap flange 110, the cartridge flange 108 and the bolts 112. The bolts 112 may be tightened to a predetermined threshold. In other examples, the valve packing cartridge assembly 102 is coupled to the bonnet 104 via other means (e.g., a flange separate from the valve packing cartridge assembly 102).

The example method 600 includes sliding a valve stem through a packing stem aperture of a valve packing cartridge assembly (block 606). In some examples, once the valve packing cartridge assembly 102 is coupled to the bonnet 104, the valve stem 118 can be slid through the packing stem aperture 324 by first aligning the valve stem 118 with the cap aperture 114 via the cap aperture chamfer 222 and sliding the valve stem 118 through the packing stem aperture 324 starting at the first end 204. In an additional example, the valve stem 118 is installed in a valve prior to the installation of the valve packing cartridge assembly 102 such that sliding the valve stem 118 through the packing stem aperture 324 begins at the second end 206 through the aperture 326, continues through the packing stem aperture 324 and exits through the cap aperture 114. The valve stem 118 may be lubricated (e.g., using grease) to enable a low-friction installation of the valve stem 118 through the valve packing cartridge assembly 102. In this example, the valve stem 118 is a sliding stem, however, the valve stem 118 can instead be a rotary shaft or any other stem or shaft suitable for use with a valve.

The example method 600 includes coupling a cap to meet a cartridge to apply a load to a stack of packing components (block 608). In some examples, fully coupling the cap 116 to the cartridge 202 includes coupling the valve packing cartridge assembly 102 to the bonnet 104. Additionally, coupling the cap 116 to the cartridge 202 includes compressing the biasing element 306 to apply a predetermined compressive load to the stack of packing components 304. Additionally, the stack of packing components 304, when compressed by the biasing element 306, may expand radially to create a desired seal against the valve stem 118 and the bore 322 of the cartridge 202. In additional examples, the seal created by the stack of packing components 304 under a compressive load from the biasing element 306 allows for the movement of the valve stem 118 without compromising the desired integrity of the seal between the stack of packing components 304, the valve stem 118, and the bore 322 of the cartridge 202.

From the foregoing, it will be appreciated that valve packing apparatus and related methods to install valve packing components have been disclosed that functionally prevent improper valve packing component installation (e.g., components installed in the incorrect order and/or backwards, misalignment of packing components, inaccurate application of load to the packing components, etc.) and/or damage to the valves and/or the packing components. Known packing installation and servicing processes are difficult and error-prone, particularly in a field service situation. Some example methods and apparatus described herein enable a person to ensure the installation of valve packing components in the correct order and orientation. Further, some disclosed examples ensure a precise, predetermined compressive load is applied to the packing components while eliminating the need for a person to manually adjust the load during installation of the valve packing components. Further still, some disclosed examples enable a person to service a valve packing by removing the packing components from a bore of a valve as an assembly. By enabling a person to correctly (e.g., correct orientation, alignment, order, etc.) install a valve packing and apply the desired load to the stack of packing components without manual adjustment or damage to a valve, the installation of valve packing components becomes more efficient, increasing the performance of the valve and/or reducing and/or preventing adverse effects (e.g., leaks in a fluid valve, undesired changes in pressure, and/or damage to valves and/or packing components) that could have otherwise been caused by known valve packing installation apparatus and/or procedures.

Example methods, apparatus, systems, and articles of manufacture to install a valve packing are disclosed herein. Further examples and combination thereof include the following:

Example 1 includes an apparatus to install a valve packing comprising a cartridge including packing components and a spring, the cartridge dimensioned to fit in a bore of a bonnet of a valve, and a cap coupled to the cartridge to retain the packing components and the spring, the cap to compress the packing components and the spring to a predetermined load in response to the cartridge being fastened to the bonnet of a valve.

Example 2 includes the apparatus of example 1 wherein the cartridge has a first end and a second end, the cap disposed at the first end, the second end having an aperture to receive a stem of a valve.

Example 3 includes the apparatus of example 2, wherein the packing components and the spring are inserted into the cartridge via the first end.

Example 4 includes the apparatus of example 2, wherein the cartridge has an annular groove proximate the first end to receive a retaining ring to retain the cap.

Example 5 includes the apparatus of example 1 wherein the cap has an aperture to receive a stem of a valve.

Example 6 includes the apparatus of example 5, further including a spring follower to maintain alignment of the spring prior to the insertion of a stem of the valve into the aperture of the cap.

Example 7 includes the apparatus of example 1, wherein the cap includes a flange, the flange to receive bolts to fasten the cartridge to the bonnet.

Example 8 includes the apparatus of example 7, wherein the cartridge includes a flange to receive bolts.

Example 9 includes the apparatus of example 1 wherein the predetermined compressive load is to form a seal around a valve stem and an inner surface of the cartridge.

Example 10 includes the apparatus to install a valve packing comprising a cylindrical tube having a first end and a second end, the tube having an outer surface dimensioned to fit within a bore of a valve, a biasing member disposed proximate the first end of the tube, packing components disposed within the tube adjacent the biasing member, and a cap to retain the packing components and the biasing member within the cylindrical tube, the cap to compress the packing components and the biasing member to a predetermined load after the cylindrical tube has been inserted into the bore of the valve.

Example 11 includes an apparatus of claim 10 wherein the biasing member and the packing components are compressed in response to the cap and the cylindrical tube being fastened to the valve.

Example 12 includes the apparatus of example 10, wherein the packing components and the biasing member, after the cap and the cylindrical tube are fastened to the valve, require no adjustment to enable a desired operation of the valve.

Example 13 includes the apparatus of example 10, wherein the cylindrical tube includes a flange.

Example 14 includes the apparatus of example 10, wherein the cap is dimensioned to receive the first end of the tube.

Example 15 includes the apparatus of example 10, wherein a fastening of the cylindrical tube and the cap initiates the coupling of the cylindrical tube and the valve.

Example 16 includes the apparatus of example 10, wherein the cylindrical tube, the cap, the biasing member, and the packing components can be removed from the bore of the valve as an assembly.

Example 17 includes an apparatus to install a valve packing comprising means for applying a predetermined compressive load to packing components and means for compressing the means for applying the predetermined compressive load.

Example 18 includes the apparatus of claim 17 wherein the means for applying the predetermined compressive load to the packing components includes a spring.

Example 19 includes the apparatus of example 17, wherein the means for compressing the means for applying includes a cap.

Example 20 includes the apparatus of example 17, wherein the means for compressing is coupled to a body containing the means for applying.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to install a valve packing comprising:
a cartridge dimensioned to fit in a bore of a bonnet of a valve, the cartridge including:
 packing components;
 a first flange; and
 a spring;
a cap coupled to the cartridge to retain the packing components and the spring, the cap movable relative to the cartridge between a first position and a second position, the cap including a body defining a cavity and a second flange, the spring at least partially positioned in the cavity of the cap when the cap is coupled to the cartridge, the first flange spaced from the second flange in the first position, the first flange abutting the second flange in the second position, the cap to compress the packing components and the spring to a predetermined load in the second position, the cap having a wall portion that includes an aperture to receive a stem of the valve; and
a spring follower to maintain alignment of the spring when inserting the stem of the valve into the aperture of the cap, the spring extending between the wall portion and the spring follower, at least a portion of the spring follower positioned within the cavity of the cap.

2. The apparatus of claim 1, wherein the cartridge has a first end and a second end, the cap disposed at adjacent the first end, the second end having an aperture to receive the stem of the valve.

3. The apparatus of claim 2, wherein the packing components and the spring are inserted into the cartridge via the first end.

4. The apparatus of claim 2, further including a retaining ring to couple the cap and the cartridge, wherein the cartridge has an annular groove proximate the first end to receive the retaining ring, the cap including an annular slot on an inner surface of the cap defining a first lip and a second lip, the retaining ring to slide within the annular slot to enable the cap to move in a rectilinear direction relative to the cartridge, the retaining ring to engage the first lip and the second lip to restrict movement of the cap between the first position and the second position, respectively.

5. The apparatus of claim 2, wherein an inner surface of the cap is dimensioned to receive an outer surface of the first end.

6. The apparatus of claim 1, wherein the predetermined load is to form a seal around the stem and an inner surface of the cartridge.

7. The apparatus of claim 1, wherein the spring follower includes a portion to be disposed between the spring and the stem of the valve.

8. An apparatus to install a valve packing comprising:
a cylindrical tube having a first end and a second end, the cylindrical tube having an outer surface dimensioned to fit within a bore of a valve, the cylindrical tube including a first flange;
a spring disposed proximate the first end of the cylindrical tube;
packing components disposed within the cylindrical tube adjacent the spring;
a cap to retain the packing components and the spring within the cylindrical tube, the cap defining a cavity and an annular slot formed on an inner surface of the cap defining the cavity, the annular slot defining a first shoulder and a second shoulder spaced from the first shoulder, the cap movable relative to the cylindrical tube between a first position and a second position; and
a retaining ring to couple the cap and the cylindrical tube, the retaining ring to engage the first shoulder of the cap when the cap is in the first position, the retaining ring to engage the second shoulder of the cap when the cap is in the second position.

9. The apparatus of claim 8, wherein the spring and the packing components are compressed in response to the cap and the cylindrical tube being fastened to the valve.

10. The apparatus of claim 8, wherein the packing components and the spring, after the cap and the cylindrical tube are fastened to the valve, require no adjustment to enable a desired operation of the valve.

11. The apparatus of claim 8, wherein the cap is dimensioned to receive the first end of the cylindrical tube.

12. The apparatus of claim 8, wherein a fastening of the cylindrical tube and the cap couples the cylindrical tube and the valve.

13. The apparatus of claim 8, wherein the cylindrical tube, the cap, the spring and the packing components can be removed from the bore of the valve as an assembly.

14. The apparatus of claim 8, wherein an inner surface of the cap is dimensioned to receive an outer surface of the first end.

15. The apparatus of claim 8, wherein the cap is to couple to the cylindrical tube prior to positioning the cylindrical tube within the bore of the valve.

16. The apparatus of claim 8, further including a retainer to couple the cap and the cylindrical tube, the retainer to enable the cap to slide relative to the cylindrical tube.

17. The apparatus of claim 8, further including a spring follower to maintain alignment of the spring prior to an insertion of a valve stem of the valve into the cylindrical tube, at least a portion of the spring follower to be disposed between the spring and the valve stem of the valve.

18. The apparatus of claim 8, wherein the cap includes a cavity to receive the spring.

19. An apparatus to install a valve packing comprising:
   means for sealing a valve stem;
   means for housing the means for sealing;
   means for biasing the means for sealing;
   means for maintaining alignment of the means for biasing prior to an insertion of the valve stem of a valve into the means for housing, at least a portion of the means for maintaining alignment to be disposed between the means for biasing and the valve stem of the valve; and
   means for compressing having means to receive at least a portion of the means for biasing, the means for compressing coupled to the means for housing, the means for biasing extending between the means for compressing and the means for maintaining alignment, the means for compressing movable relative to the means for housing between a first position and a second position to adjust a compression force of the means for biasing; and
   means for retaining to slidably couple the means for compressing and the means for housing, the means for retaining fixed to the means for housing and slidably coupled to the means for compressing, the means for retaining to engage means for limiting slidable movement of the means for compressing to limit movement of the means for compressing between the first position and the second position relative to the means for housing.

20. The apparatus of claim 19, further including means for adjusting a position of the means for compressing relative to the means for housing.

* * * * *